(12) United States Patent
Mussmann et al.

(10) Patent No.: US 12,509,644 B2
(45) Date of Patent: *Dec. 30, 2025

(54) ARTIFICIALLY ENHANCED CUTINASE CONTAINING WASHING OR CLEANING AGENT

(71) Applicant: Henkel AG & Co. KGaA, Duesseldorf (DE)

(72) Inventors: Nina Mussmann, Willich (DE); Susanne Wieland, Zons/Dormagen (DE); Christian Degering, Erkrath (DE); Layla Fernandez, Cologne (DE); Stephanie Turowski, Leichlingen (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 1064 days.

This patent is subject to a terminal disclaimer.

(21) Appl. No.: 17/430,725

(22) PCT Filed: Feb. 19, 2020

(86) PCT No.: PCT/EP2020/054280
§ 371 (c)(1),
(2) Date: Aug. 13, 2021

(87) PCT Pub. No.: WO2020/169630
PCT Pub. Date: Aug. 27, 2020

(65) Prior Publication Data
US 2022/0364027 A1 Nov. 17, 2022

(30) Foreign Application Priority Data

Feb. 21, 2019 (EP) ..................................... 19158501

(51) Int. Cl.
*C11D 3/386* (2006.01)
*C11D 3/00* (2006.01)
*C12N 9/18* (2006.01)

(52) U.S. Cl.
CPC ........ *C11D 3/38636* (2013.01); *C11D 3/0036* (2013.01); *C12N 9/18* (2013.01); *C11D 2111/12* (2024.01); *C12Y 301/01074* (2013.01)

(58) Field of Classification Search
None
See application file for complete search history.

(56) References Cited

U.S. PATENT DOCUMENTS 6,995,005 B1 2/2006 Deckwer et al.

FOREIGN PATENT DOCUMENTS

| DE | 69632910 T2 | 8/2005 |
| EP | 0827534 B1 | 7/2004 |
| WO | 2015135757 A1 | 9/2015 |
| WO | 2017129436 A1 | 8/2017 |
| WO | 2018011281 A1 | 1/2018 |
| WO | 2018011284 A1 | 1/2018 |
| WO | 2019038164 A1 | 2/2019 |

OTHER PUBLICATIONS

Chica et al. Curr Opin Biotechnol. Aug. 2005; 16(4):378-84. (Year: 2005).*
Singh et al. Curr Protein Pept Sci. 2017, 18, 1-11 (Year: 2017).*
Bornscheuer et al. Curr Protoc Protein Sci. Nov. 2011;Chapter 26: Unit26.7. (Year: 2011).*
Yoshikuni et al. Curr Opin Chem Biol. Apr. 2007; 11(2):233-9. (Year: 2007).*
Accession G9BY57. Feb. 22, 2012 (Year: 2012).*
European Search Report from parallel EP-application 19 158 501.7 dated Jul. 30, 2019, (7 pages), for information purpose only.
International Search Report from parallel PCT-application PCT/EP2020/054280 dated Apr. 14, 2020, (7 pages), for Information purpose only.
Database Uni Prot [Online], Poly(Ethyleneterephthalate) hydrolase, Feb. 28, 2018, Database accession No. A0A2H5Z9R5 sequence, XP-002793077.
Altschul et al., "Gapped BLAST and PSI-BLAST: a new generation of protein database search programs", Nucleic Acids Research, 1997, pp. 3389-3402, vol. 25, No. 17, Oxford University Press.
Altschul et al., "Basic Local Alignment Search Tool", J. Mo. Biol., 1990, pp. 403-410, Academic Press Limited.
Chenna et al., "Multiple sequence alignment with the Clustal series of programs", Nucleic Acids Research, 2003, pp. 3497-3500, vol. 31, No. 13, Oxford University Press.
Notredame et al., "T-Coffee: A Novel Method for Fast and Accurate Multiple Sequence Alignment", J. Mol. Biol., 2000, pp. 205-217, Academic Press.
Bender et al., "The Determination of the Concentration of Hydrolytic Enzyme Solutions : a-Chymotrypsin, Trypsin, Papain, Elastase, Subtilisin, and Acetylcholinesterase", Journal of the American Chemical Society, 1966, pp. 5890-5913.
Sulaiman et al., "Isolation of a Novel Cutinase Homolog with Polyethylene Terephthalate-Degrading Activity from Leaf-Branch Compost by Using a Metagenomic Approach", Applied and Environmental Microbiology, 2011, pp. 1556-1562, AEM Journals.

* cited by examiner

*Primary Examiner* — Christian L Fronda
(74) *Attorney, Agent, or Firm* — CANTOR COLBURN LLP

(57) ABSTRACT

Enzymes are disclosed that have anti-pilling properties and may be used in washing or cleaning agents. A washing or cleaning agent, in particular a liquid detergent, may include a cutinase. A method for cleaning textiles using such a washing or cleaning agent may be useful for removal of soiling, for reducing the pilling effects on textiles, for improving the anti-greying effects, for improving the cleaning performance of such a washing or cleaning agent, and combinations thereof. The cutinase may have at least 65% sequence identity with the amino acid sequence set forth in SEQ ID NO:1 over the entire length thereof and have at least one or more amino acid substitutions at positions 61, 63, 66, 89, 90, 92, 155, 177, 208 and 211.

11 Claims, No Drawings

Specification includes a Sequence Listing.

SEQUENCE LISTING

```
<160> NUMBER OF SEQ ID NOS: 2

<210> SEQ ID NO 1
<211> LENGTH: 260
<212> TYPE: PRT
<213> ORGANISM: Artificial
<220> FEATURE:
<223> OTHER INFORMATION: cutinase active fragment

<400> SEQUENCE: 1

Ser Asn Pro Tyr Gln Arg Gly Pro Asn Pro Thr Arg Ser Ala Leu Thr
1               5                   10                  15

Ala Asp Gly Pro Phe Ser Val Ala Thr Tyr Thr Val Ser Arg Leu Ser
            20                  25                  30

Val Ser Gly Phe Gly Gly Gly Val Ile Tyr Tyr Pro Thr Gly Thr Ser
```

```
            35                  40                  45
Leu Thr Phe Gly Gly Ile Ala Met Ser Pro Gly Tyr Thr Ala Asp Ala
 50                  55                  60

Ser Ser Leu Ala Trp Leu Gly Arg Arg Leu Ser His Gly Phe Val
 65                  70                  75                  80

Val Leu Val Ile Asn Thr Asn Ser Arg Phe Asp Tyr Pro Asp Ser Arg
                 85                  90                  95

Ala Ser Gln Leu Ser Ala Ala Leu Asn Tyr Leu Arg Thr Ser Ser Pro
                100                 105                 110

Ser Ala Val Arg Ala Arg Leu Asp Ala Asn Arg Leu Ala Val Ala Gly
                115                 120                 125

His Ser Met Gly Gly Gly Thr Leu Arg Ile Ala Glu Gln Asn Pro
                130                 135                 140

Ser Leu Lys Ala Ala Val Pro Leu Thr Pro Trp His Thr Asp Lys Thr
145                 150                 155                 160

Phe Asn Thr Ser Val Pro Val Leu Ile Val Gly Ala Glu Ala Asp Thr
                165                 170                 175

Val Ala Pro Val Ser Gln His Ala Ile Pro Phe Tyr Gln Asn Leu Pro
                180                 185                 190

Ser Thr Thr Pro Lys Val Tyr Val Glu Leu Asp Asn Ala Ser His Phe
                195                 200                 205

Ala Pro Asn Ser Asn Asn Ala Ala Ile Ser Val Tyr Thr Ile Ser Trp
                210                 215                 220

Met Lys Leu Trp Val Asp Asn Asp Thr Arg Tyr Arg Gln Phe Leu Cys
225                 230                 235                 240

Asn Val Asn Asp Pro Ala Leu Ser Asp Phe Arg Thr Asn Asn Arg His
                245                 250                 255

Cys Gln Pro Ser
            260

<210> SEQ ID NO 2
<211> LENGTH: 783
<212> TYPE: DNA
<213> ORGANISM: Artificial
<220> FEATURE:
<223> OTHER INFORMATION: coding sequence for cutinase active fragment

<400> SEQUENCE: 2
tctaacccgt atcaaagagg tccgaacccg acgagaagtg ctctgactgc tgatggtccg      60
ttttccgtgg cgacttacac cgtgagccgt ctgagtgtgt cgggatttgg cggtggagtt     120
atttattacc cgacgggcac ttcactgact ttcggcggta tcgccatgtc tccgggttat     180
accgccgatg cgtcttcact ggcctggctg ggacgccgtc tggcttccca tggttttgtg     240
gttctggtta ttaatacaaa cagtcgcttc gattatccgg acagccgtgc ttcacagctg     300
tctgcggcac tgaattacct gagaacgtct tccccgtcag ctgtgagagc aagactggac     360
gctaaccgtc tggcggttgc aggtcatagc atgggaggcg gtggaactct gcgcatcgca     420
gaacaaaatc cgagcctgaa agctgctgtc ccgctgaccc cgtggcacac cgataaaaca     480
tttaacacgt ctgtcccggt actgattgta ggagccgaag ctgacaccgt cgcgccggta     540
```

```
tcgcagcatg caatcccgtt ttatcaaaat ctgccgtcca ccacaccgaa agtgtacgtt    600
gaactcgata atgcctcgca cttcgctccg aacagcaata acgcggcaat ttccgtctat    660
acaatcagtt ggatgaaact gtgggtagat aacgacacgc gttacagaca gtttctgtgc    720
aatgtcaacg atccggcgct gagcgacttc cgcacgaaca acagacattg ccaaccgagc    780
taa                                                                 783
```

ARTIFICIALLY ENHANCED CUTINASE CONTAINING WASHING OR CLEANING AGENT

CROSS-REFERENCE TO RELATED APPLICATIONS

The present application is a national stage entry according to 35 U.S.C. § 371 of PCT application No.: PCT/EP2020/054280 filed on Feb. 19, 2020; which claims priority to European Patent Application Serial No.: 19158501.7 filed on Feb. 21, 2019; all of which are incorporated herein by reference in their entirety and for all purposes.

REFERENCE TO A SEQUENCE LISTING SUBMITTED VIA EFS-WEB

The content of the ASCII text file of the sequence listing named "20200213-Application_version_Sequence_listing", which is 4 kb in size was created on Feb. 21, 2019; the sequence listing is incorporated by reference in its entirety. The sequence listing was corrected on Jan. 5, 2021 to explain the source of the genetic material; the corrected sequence listing was electronically submitted via EFS-Web herewith; the corrected sequence listing is incorporated by reference in its entirety.

TECHNICAL FIELD

The invention relates to enzyme technology, in particular to enzymes having anti-pilling properties, which e.g. are used in washing or cleaning agents. The invention relates to a washing or cleaning agent, in particular a liquid detergent, the agent comprising a cutinase as defined herein. Further the invention relates to a method for cleaning of textiles by use of such a washing or cleaning agent as well as to the use of a washing or cleaning agent according to the invention for removing of soiling. Furthermore, the invention relates to the use of a cutinase in a washing or cleaning agent for reducing the pilling effects on textiles and for improving the anti-greying effects of such an agent.

BACKGROUND

If clothes or other textiles are washed several times, over the time they will show pilling. This phenomenon applies to all types of textiles and is undesirable for the consumer, as due to pilling the garment or textiles appear older and unsightly. The term "pilling" is used to describe the formation of nodules or fluff in fabrics. These small fluffs occur especially in short-fiber fabrics. Pilling, on the other hand, is less severe with long-fiber fabrics and twisted fibers. In general, these nodules are caused by loose fibers in the fabric or those that have loosened from the fabric. Due to their smooth surface, synthetic fibers are more prone to pilling than natural fibers, since synthetic fibers can be loosened from the fabric more quickly than rough natural fibers. In wool fabrics, these fibers "felt" mainly as a result of mechanical friction and form nodules on the surface.

The main effect of pilling is an optical impairment. Due to formation of nodules on the surface, fabrics look relatively soon used and older than they actually are. In addition, the colors of colored textiles appear less brilliant. On the other hand, the functionality of the fabric is hardly or not at all impaired. Pilling especially takes place in mechanically stressed areas, mostly in the shoulder and waistband area. Furthermore, due to continuous thinning of the fabric, these stressed areas in particular are at risk of forming holes or even tearing. As a result of the undesirable pilling and/or thinning of the textiles, consumers sort out and discard them more quickly than it would be necessary on basis of the functionality of the textile.

Furthermore, textiles tend to turn grey when washed. This is because during the washing process dirt as well as detached pigments from colored textiles are released. Although attempts are made to keep them in the washing liquor by using various detergent ingredients, it is still often impossible to prevent the dirt/pigments from depositing on the textile and remaining on it. This is the so-called "greying effect". This is particularly pronounced with some synthetic fibers such as polyamide, but also polyester.

A technical solution for reducing the pilling effect has so far only been available for cotton textiles. Cellulases are used in detergents to reduce the pilling effect (see e.g. DE 69632910 T3). This means that cellulases are used in the detergent to impart an anti-pilling and/or anti-grey effect and thus ensure that the textile looks like new for longer. Cellulases, however, only work on cotton textiles. For other textiles, such as polyester textiles, yet there is no comparable way to reduce pilling effects on textiles of this kind. Therefore, it is desirable and there is a demand for solutions to reduce pilling on textiles, especially textiles containing synthetic fibers such as polyester, in order to make textiles look new for as long as possible, i.e. the colors should remain strong, the shape should be retained and the surfaces should remain smooth and undamaged.

PET esterases degrade polymeric polyethylene glycol terephtalate (PET) into its oligomers, dimers and monomers or even into terephatalic acid (TPA) and ethylene glycol (EG). Several PET-degrading enzymes have been found which are hydrolases, mostly with alpha-beta-hydrolase-type fold. Among those are enzymes with known functions like e.g. lipases, esterases, cutinases and the like. Such enzymes, due to their PET degrading ability are also named PETases. These enzymes are quite stable by nature and hence are suitable for their application in technical processes. In particular, the cutinase originates from a fungus that uses the enzymes in their natural function to degrade the cutin layer of leaves in order to reach for the leave-structures underneath. Hence the enzymes have undergone a process of natural evolution that enabled them to stay functional under outside weather conditions. The enzyme is a protein and hence a biological material that is fully biodegradable.

Recently it was found that a cutinase identified by a metagenomic approach in leaf compost (Sulaiman et al. (2011) "Isolation of a Novel Cutinase Homolog with polyester-Degrading Activity from Leaf-Branch Compost by Using a Metagenomic Approach", Appl. Environ. Microbiol. 78(5):1556-1562), shows fast polyester (PET) degradation at 50° C. and, moreover, is active under washing process conditions and has various care properties for polyester textiles (applicant's unpublished international patent application PCT/EP2018/072173). This is surprising in so far as previously known cutinases and PET esterases are more active at higher temperatures (>=60° C.) and, moreover, are only able to degrade polyester very slowly.

SUMMARY

Surprisingly, the inventors have now found that certain variants of the cutinase described above have a significantly improved performance compared to the wild type cutinase.

It was found that these cutinases provide improved PET degradation and that they moreover, on the one hand, prevent pilling on new polyester textiles and/or support this effect in combination with a cellulase on polyester/cotton blend textiles. On the other hand, already formed pills can be reduced, i.e. it can cause a so-called "renew" effect. Furthermore, the cutinases prevent greying of white laundry and fading/greying of colored laundry. In addition, the cutinases show a direct cleaning effect on stains on polyester textiles. It was also found that with the appropriate dosage, all these positive washing properties are achieved without significantly damaging the fiber. Another important aspect, especially when treating textiles containing polyester, is sustainability. As the textiles look as good as new for longer, they are worn longer and are less frequently replaced by newly purchased pieces. This leads to a reduction in $CO_2$ footprint as less polyester is used in the production of new textiles.

Therefore, in a first aspect, a washing or cleaning agent may include a cutinase which has at least 65% sequence identity with the amino acid sequence set forth in SEQ ID NO:1 over the entire length thereof and has, with respect to the numbering according to SEQ ID NO:1, at least one amino acid substitution at at least one of the positions corresponding to the positions 61, 63, 66, 89, 90, 92, 155, 177, 208 and 211, in particular at least one of the amino acid substitutions T61S, D63E, D63T, S66A, S66C, R89L, R89K, F90I, Y92D, Y92C, Y92A, W155A, W155Y, V177P, F208E, F208Q, F208Y, N211E, N211D, and N211Q.

In a further aspect, methods for cleaning of textiles may include applying a washing or cleaning agent to a textile. The textiles are preferably polyester-containing textiles or consist of polyester.

In yet another aspect, the washing or cleaning agent, especially a liquid washing agent may remove stains and soiling.

In addition, a further aspect comprises the use of the cutinases described herein for reducing pilling effects and/or for improving the anti-grey effect and/or for improving the cleaning performance of an agent, preferably a washing or cleaning agent, particularly preferred a liquid washing agent, the agent containing one of the cutinases.

These and other aspects, features and advantages become apparent to the skilled person from the study of the following detailed description and claims. Each feature from one aspect of the invention can be used in any other aspect of the invention. Furthermore, it is clear that the examples provided herein are intended to describe and illustrate the invention but not to restrict it and, in particular, not to limit the invention to these examples.

DETAILED DESCRIPTION

Numeric ranges specified in the format "from x to y" include the specified values. If several preferred numeric ranges are specified in this format, it will of course be understood that all ranges resulting from the combination of the different endpoints will also be included.

"At least one", as used herein, means one or more, i.e. 1, 2, 3, 4, 5, 6, 7, 8, 9, 10 or more.

"Liquid", as used herein, includes liquids and gels as well as pasty compositions. It is preferred that the liquid compositions be flowable and pourable at room temperature, but it is also possible that they have a yield point.

A cutinase (EC 3.1.1.74), also known as cutin hydrolase, is an enzyme that belongs to the α/β-hydrolases and hydrolyzes cutin. Cutinase is produced by a number of plant pathogenic fungi and bacteria (cutinase enables fungi to break down the ester bond of cutin in the cuticle of plants and thus penetrate the plants).

The observed benefits of the cutinase are manifold. Particularly, the cutinase provides improved PET degradation. Furthermore, on the one hand, the enzyme prevents the formation of pills on new polyester textiles or supports this effect in combination with a cellulase on polyester/cotton mixed textiles. On the other hand, already formed pills can be reduced, which corresponds to the so-called "renew" effect, which is currently advertised in wool care products and is caused on cotton textiles by the cellulase technology. In addition, cutinase prevents greying of white laundry and fading/greying of colored laundry. In addition, the cutinase has a direct cleaning effect on soiling on textiles containing polyester. By using cutinases in washing and cleaning agents, the "renew" effect known from wool care products can also be transferred to polyester textile care products.

In the context, cleaning performance is understood to mean the lightening performance on one or more soiling, in particular on polyester textiles. The washing or cleaning agent may include the cutinase as well as the washing or cleaning liquor formed by this agent have a respective cleaning performance.

The washing liquor is understood to be the working solution containing the washing or cleaning agent, which solution acts on textiles or fabric and thus comes into contact with the soiling present on textiles or fabrics. The washing liquor conventionally arises when the washing or cleaning process begins and the washing or cleaning agent is diluted with water for example in a washing machine or in another suitable container.

In various embodiments, the cutinase is a freely available enzyme. This means that the cutinase can act directly with all components of the agent and, if the agent is a liquid, that the cutinase is in direct contact with the solvent (e.g. water). In further embodiments, the cutinase may form an interaction complex with other molecules or may include a "coating". A single or multiple cutinase molecule(s) may be separated from other components of the agent by a surrounding structure. Such a separating structure may be formed by, but is not limited to, vesicles such as a micelle or a liposome. The surrounding structure can also be a virus particle, a bacterial cell or a eukaryotic cell.

Amino acid substitutions at positions of the cutinase described herein may improve the overall performance of the washing and cleaning agents.

In various embodiments, the cutinase used in agents is a cutinase having at least 65% sequence identity with the amino acid sequence set forth in SEQ ID NO:1 over the entire length thereof and having, with respect to the numbering according to SEQ ID NO:1, at least one amino acid substitution at at least one of the positions corresponding to the positions 61, 63, 66, 89, 90, 92, 155, 177, 208 and 211, in particular at least one of the amino acid substitutions T61S, D63E, D63T, S66A, S66C, R89L, R89K, F90I, Y92D, Y92C, Y92A, W155A, W155Y, V177P, F208E, F208Q, F208Y, N211E, N211D, and N211Q.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution T61S at the position corresponding to position 61 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution D63E at the position corresponding to position 63 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution D63T at the position corresponding to position 63 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution S66A at the position corresponding to position 66 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution S66C at the position corresponding to position 66 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution R89L at the position corresponding to position 89 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution R89K at the position corresponding to position 89 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution F90I at the position corresponding to position 90 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution Y92D at the position corresponding to position 92 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution Y92C at the position corresponding to position 92 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution Y92A at the position corresponding to position 92 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution W155A at the position corresponding to position 155 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution W155Y at the position corresponding to position 155 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution V177P at the position corresponding to position 177 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution F208E at the position corresponding to position 208 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution F208Q at the position corresponding to position 208 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution F208Y at the position corresponding to position 208 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution N211E at the position corresponding to position 211 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution N211D at the position corresponding to position 211 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, the amino acid substitution N211Q at the position corresponding to position 211 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, at least one of the amino acid substitution pairs T61S and F208E, D63T and N211E, S66A and V177P, S66C and N211D, R89L and W155Y, R89K and W155A, F90I and N211Q, and Y92D and V177P at the positions corresponding to positions 61 and 208, 63 and 211, 66 and 177, 66 and 211, 89 and 155, 90 and 211, and 92 and 177 of SEQ ID NO:1.

In further embodiments, the cutinase used in the agent is a cutinase having at least 65% sequence identity with the amino acid sequence set forth in SEQ ID NO:1 over the entire length thereof and having, based on the numbering according to SEQ ID NO:1, any combination of the amino acid substitutions T61S, D63E, D63T, S66A, S66C, R89L, R89K, F90I, Y92D, Y92C, Y92A, W155A, W155Y, V177P, F208E, F208Q, F208Y, N211E, N211D, and N211Q.

In further embodiments cutinases may be derived from the amino acid sequences set forth in SEQ ID NO:1, for example by mutagenesis.

In various further embodiments, the agents may also contain cutinases obtainable by expression of the nucleotide sequences according to SEQ ID NO:2. In one aspect, the nucleotide sequences may be set forth in SEQ ID NO:2 as well as nucleotide sequences which are related to these nucleotide sequences, having over the entire length thereof at least 80%, 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, 98.8%, 99.0%, 99.2%, 99.4% or 99.6% sequence identity, with the proviso that the native sequence coding for the cutinase is excluded.

In various embodiments, the cutinase comprises an amino acid sequence which has a sequence identity of at least 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, 98.8%, 99.0%, 99.2%, 99.4% or 99.6% to the amino acid sequence set forth in SEQ ID NO:1 and which has at least one amino acid substitution, preferably at least one amino acid substitution which is selected from the group consisting of T61S, D63E, D63T, S66A, S66C, R89L, R89K, F90I, Y92D, Y92C, Y92A, W155A, W155Y, V177P, F208E, F208Q, F208Y, N211E, N211D, and N211Q, at at least one of the positions corresponding to positions 61, 63, 66, 89, 90, 92, 155, 177, 208 and 211, based on the numbering according to SEQ ID NO: 1.

In various further embodiments, the agent is characterized in that
(a) the cutinase can be obtained from a cutinase as defined as above as a starting molecule by single or multiple conservative amino acid substitution; and/or
(b) the cutinase can be obtained from a cutinase as defined as above as a starting molecule by fragmentation, deletion mutagenesis, insertion mutagenesis, or substitution mutagenesis and comprises an amino acid sequence that matches the starting molecule over a length of at least 169, 170, 180, 190, 200, 210, 220, 230, 240, 245, 250, 251, 252, 253, 254, 255, 256, 257, 258, 259 or 260 interconnected amino acids, the at least one amino acid substitutions contained in the starting molecule still being present in the at least one position selected from the positions that correspond to positions 61, 63, 66, 89, 90, 92, 155, 177, 208 and 211 in SEQ ID NO:1.

The agents preferably comprise the cutinase in an amount of 0.00001 to 1 wt. %, more preferably in an amount of 0.0001 to 0.5 wt. %, more particularly preferred in an amount of 0.001 to 0.1 wt. %, in each case based on the active protein.

In the context, the feature that a cutinase has at least one of the specified amino acid substitutions means that it contains at the respective position one (or more) of the specified amino acid substitution(s), i.e. at least the specified positions are not otherwise mutated or deleted, e.g. by fragmentation of the cutinase.

The identity of nucleic acid or amino acid sequences is determined by a sequence comparison. Such a comparison is done by assigning similar sequences to one another in the nucleotide sequences or amino acid sequences. This sequence comparison is preferably performed on the basis of the conventionally used BLAST algorithm established in the prior art (cf. e.g. Altschul et al. (1990) "Basic local alignment search tool", J. Mol. Biol. 215:403-410, and Altschul et al. (1997) "Gapped BLAST and PSI-BLAST: a new generation of protein database search programs"; Nuc. Acids Res. 25:3389-3402) and in principle is done by assigning similar sequences of nucleotides or amino acids in the nucleic acid or amino acid sequences to one another. A tabular assignment of the positions in question is known as an alignment. A further algorithm available in the prior art is the FASTA algorithm. Sequence comparisons (alignments), in particular multiple sequence comparisons, are conventionally created using computer software. Use is often made for example of the Clustal series (cf. e.g. Chenna et al. (2003) "Multiple sequence alignment with the Clustal series of programs", Nuc. Acids Res. 31:3497-3500), T-Coffee (cf. e.g. Notredame et al. (2000) "T-Coffee: A novel method for multiple sequence alignments", J. Mol. Biol. 302:205-217) or programs which are based on these programs or algorithms. For the purposes sequence comparisons and alignments are preferably performed with the computer program Vector NTI® Suite 10.3 (Invitrogen Corporation, 1600 Faraday Avenue, Carlsbad, California, USA) using the preset default parameters.

Such a comparison allows a statement to be made about the similarity of the compared sequences. It is conventionally stated in percent identity, i.e. the proportion of identical nucleotides or amino acid residues therein or in an alignment of mutually corresponding positions. The broader term "homology" also includes consideration of amino acid substitutions conserved in amino acid sequences, thus amino acids with similar characteristics, since they generally have similar activities or functions within the protein. The similarity of the compared sequences may therefore also be stated in percent homology or percent similarity. Statements regarding identity and/or homology may be made over entire polypeptides or genes or only over individual domains. Homologous or identical domains of various nucleic acid or amino acid sequences are therefore defined by matches in the sequences. They often have identical or similar functions. They may be small and comprise only a few nucleotides or amino acids. Often such small domains exercise functions which are essential for the overall activity of the protein. It may therefore be meaningful to relate sequence matches only to individual, optionally small domains. If not stated otherwise, however, statements regarding identity or homology in the present application relate to the entire length of the nucleic acid or amino acid sequence indicated in each case.

In the context, the indication that an amino acid position corresponds to a numerically designated position in SEQ ID NO:1 means that the corresponding position is associated with the numerically designated position in SEQ ID NO:1 in an alignment as defined above.

In a further embodiment, the cutinase is characterized in that its anti-pilling performance is significantly improved compared to that of a cutinase comprising an amino acid sequence corresponding to the amino acid sequence indicated in SEQ ID NO:1, i.e. it has at least 105%, 110%, 115%, 120%, 125%, 130%, 140%, 150%, 160%, 170%, 180%, 190%, 200%, 210%, 220%, 230%, 240%, 250%, 260%, 270%, 280%, 290% or 300% of the reference anti-pilling performance. The anti-pilling performance can be determined in a washing system containing a detergent at a dosage between 4.5 and 7.0 grams per liter of wash liquor and the cutinase, wherein the cutinases to be compared are used at equal concentrations (relative to active protein) and the anti-pilling performance is determined as described herein. For example, the washing process can be carried out for 60 minutes at a temperature of 40° C. and the water has a water hardness of between 15.5 and 16.5° dH (German hardness). The concentration of cutinase in the detergent intended for this washing system is from 0.00001 to 1 wt. %, preferably from 0.0001 to 0.5 wt. %, particularly preferred from 0.001 to 0.1 wt. %, based on active purified protein.

An exemplary liquid reference detergent for such a washing system is composed as follows (all data in weight-%): 4.4% alkylbenzene sulfonic acid, 5.6% anionic surfactants, 2.4% $C_{12}$-$C_{18}$ Na salts of fatty acids (soaps), 4.4% nonionic surfactants, 0.2% phosphonates, 1.4% citric acid, 0.95% NaOH, 0.01% antifoam, 2% glycerin, 0.08% preservatives, 1% ethanol, 1.6% enzyme mix (protease, amylase, cellulase, mannanase), the remainder demineralized water. The preferred dosage of the liquid detergent is between 4.5 and 6.0 grams per liter of wash liquor, for example 4.7, 4.9 or 5.9 grams per liter of wash liquor. Preference is given to washing in a pH range between pH 8 and pH 10.5, preferably between pH 8 and pH 9.

The anti-pilling performance is determined at 40° C. using a liquid detergent as indicated above, preferably by washing for 60 minutes.

The degree of whiteness, i.e. the lightening of soiling, as a measure of the cleaning performance is determined by optical measuring methods, preferably by photometric measuring methods. A suitable instrument for this is for example the spectrometer Minolta CM508d. Usually, the instruments used for the measurement are calibrated beforehand with a whiteness standard, preferably a whiteness standard supplied with the instrument.

The anti-pilling performance can be determined by visual evaluation. In this case, an inspection group assigns a value on a scale of 1-5 to the laundry to be inspected. The value=1 stands for very heavily peeled laundry, while the value=5 is assigned to non-peeled laundry.

Using the respective cutinase with the same level of activity ensures that, in case of any discrepancy in the ratio of active substance to total protein (the values of specific activity), the respective enzymatic properties, e.g. the cleaning performance on certain soiling or the anti-pilling performance, are compared. In general, a low specific activity can be compensated by adding a larger amount of protein. Furthermore, the enzymes to be investigated can also be used in the equal amount of substance or weight if the enzymes to be investigated have a different affinity to the test substrate in an activity test. In this context, the term "equal amount of substance" refers to a molar equivalent use of the enzymes to be tested. The term "equal quantity by weight" refers to an equal use of the enzymes to be tested.

Proteins can be grouped together into immunologically related proteins by reaction with an antiserum or a specific antibody. Members of such a group are characterized in that they have the same antigenic determinant recognized by an antibody. They are therefore structurally similar in that they are recognized by an antiserum or certain antibodies. A further aspect therefore relates to cutinases which are characterized in that they have at least one and increasingly preferred two, three or four identical antigenic determinants with a cutinase used in an agent. Due to their immunological similarities, such cutinases are structurally similar to the cutinases used in the agents in that it can be assumed that they also have a similar function.

Further cutinases which can be used in agents may be cutinases further comprising additional amino acid modifications, in particular amino acid substitutions, insertions or deletions, compared to the cutinase set forth in SEQ ID NO:1 and having at least one of the amino acid substitutions T61S, D63E, D63T, S66A, S66C, R89L, R89K, F90I, Y92D, Y92C, Y92A, W155A, W155Y, V177P, F208E, F208Q, F208Y, N211E, N211D, and N211Q at at least one of the positions corresponding to positions 61, 63, 66, 89, 90, 92, 155, 177, 208 and 211 of SEQ ID NO:1. Such cutinases are, for example, further developed by targeted genetic modification, i.e. by mutagenesis, and optimized for specific applications or with regard to special properties (e.g. with regard to their catalytic activity, stability, etc.). Furthermore, nucleic acids encoding the cutinases used can be introduced into recombination approaches and thus used to generate completely new cutinases or other polypeptides.

Thereby, the aim is to introduce specific mutations such as substitutions, insertions or deletions into the known molecules in order, for example, to improve the cleaning performance of enzymes. For this purpose, in particular the surface charges and/or the isoelectric point of the molecules and thus their interactions with the substrate can be modified. For example, the net charge of the enzymes can be modified in order to influence the substrate binding, especially for use in detergents. Alternatively or in addition, the stability of the cutinase can be further increased by one or more corresponding mutations, thereby improving its cleaning performance. Advantageous properties of individual mutations, e.g. individual substitutions, can complement each other. A cutinase that has already been optimized with regard to certain properties, for example with regard to its activity and/or its anti-pilling performance, can therefore be further developed.

For the description of substitutions which relate to exactly one amino acid position (amino acid exchanges), the following convention is applied: first the naturally present amino acid is designated in the form of the internationally common single letter code, then the associated sequence position and finally the inserted amino acid. Several substitutions within the same polypeptide chain are separated by slashes. With regard to insertions, additional amino acids are specified after the sequence position. With regard to deletions, the missing amino acid is replaced by a symbol, for example an asterisk or a dash, or a Δ is indicated before the corresponding position. For example, N58Q describes the substitution of asparagine at position 58 by glutamine, N58NA describes the insertion of alanine after the amino acid asparagine at position 58, and N58* or ΔN58 describe the deletion of asparagine at position 58. This nomenclature is known to experts in the field of enzyme technology.

A further aspect therefore relates to an agent containing a cutinase characterized in that it is obtainable from a cutinase as described above as a starting molecule by single or multiple conservative amino acid substitution. The term "conservative amino acid substitution" means the replacement (substitution) of one amino acid residue with another amino acid residue, which replacement does not result in a change in polarity or charge at the position of the replaced amino acid, e.g. the replacement of a non-polar amino acid residue with another non-polar amino acid residue. Conservative amino acid substitutions include, for example: G=A=S, I=V=L=M, D=E, N=Q, K=R, Y=F, S=T, G=A=I=V=L=M=Y=F=W=P=S=T.

Alternatively or in addition, the cutinase used in an agent is characterized in that it is obtainable from a cutinase as a starting molecule by fragmentation, deletion, insertion or substitution mutagenesis and comprises an amino acid sequence which has a length of at least 169, 170, 180, 190, 200, 210, 220, 230, 240, 245, 250, 251, 252, 253, 254, 255, 256, 257, 258, 259 or 260 interconnected amino acids, said cutinase having at least one amino acid substitution at at least one of the positions corresponding to positions 61, 63, 66, 89, 90, 92, 155, 177, 208 and 211. In different embodiments, the cutinases thus obtainable, even after mutagenesis/substitution, still have the sequence identities defined herein of at least 65% with the sequence according to SEQ ID NO:1.

For example, it is possible to delete individual amino acids from the termini or loops of the enzyme without losing or reducing hydrolytic activity. Furthermore, such fragmentation, deletion, insertion or substitution mutagenesis can also reduce the allergenicity of enzymes and thus improve their overall usability. It is advantageous that the enzymes retain their hydrolytic activity even after mutagenesis, i.e. their hydrolytic activity corresponds at least to that of the starting enzyme, i.e. in a preferred embodiment the hydrolytic activity is at least 80%, preferably at least 90%, of the activity of the starting enzyme. Other substitutions may also have beneficial effects. Both single and several interconnected amino acids can be substituted by other amino acids.

The further amino acid positions are defined by an alignment of the amino acid sequence of a cutinase contained in the agents with the amino acid sequence of the cutinase set forth in SEQ ID NO:1. Furthermore, the assignment of the positions depends on the mature protein. This assignment is in particular also to be applied if the amino acid sequence of a cutinase comprises a higher number of amino acid residues than the cutinase according to SEQ ID NO:1. Starting from the positions mentioned in the amino acid sequence of the cutinase according to SEQ ID NO:1, the positions of change in a cutinase contained in the agents are those which are assigned to these positions in an alignment.

Advantageous positions for sequence modifications, in particular substitutions, of the cutinase, which are preferably significant when transferred to homologous positions of the cutinases and which confer advantageous functional properties on the cutinase, are therefore the positions which correspond in an alignment to the positions described herein, i.e. in the numbering based on the amino acid sequence set forth in SEQ ID NO:1. The following amino acid residues are present at the mentioned positions in the wild type molecule of the cutinase according to SEQ ID NO:1: T61, D63, S66, R89, F90, Y92, W155, V177, F208, N211.

In various embodiments, the cutinase may have one or more further amino acids at the N- or C-terminus in addition to the sequence set forth in SEQ ID NO:1. In certain embodiments, such N-terminal peptides may be the naturally occurring signal peptides for cutinase or a single methionine residue.

A further confirmation of the correct assignment of the amino acids to be modified, i.e. in particular their functional correspondence, can be provided by comparative experiments, according to which the two positions assigned to each other on the basis of an alignment are modified in the same way in both cutinases compared with each other and it is observed whether the enzymatic activity or the anti-pilling performance is modified in the same way in both. If, for example, an amino acid substitution in a certain position of the cutinase according to SEQ ID NO:1 is accompanied by a change in an enzymatic parameter, for example an increase in the KM value, and if a corresponding change in the enzymatic parameter, for example also an increase in the KM value, is observed in a cutinase variant contained in an agent, the amino acid substitution of which was achieved by the same introduced amino acid, then this is to be seen as confirmation of the correct assignment.

All percentages given in connection with the compositions/agents described herein refer, unless explicitly stated otherwise, to weight percent (wt. %) of the respective composition/agent.

In the context, fatty acids or fatty alcohols or their derivatives, respectively—unless stated otherwise—represent branched or unbranched carboxylic acids or alcohols or their derivatives, respectively, with preferably 6 to 22 carbon atoms. In particular, the oxo alcohols or their derivatives, respectively, available after ROELEN's oxo synthesis, for example, can also be used accordingly.

Whenever in the following alkaline earth metals are mentioned as counterions for monovalent anions, this means that the alkaline earth metal is of course only present in half the amount of material such as the anion sufficient to balance the charge.

All conceivable types of washing or cleaning agents may be possible, such as both concentrates and agents to be used in undiluted form, for use on a commercial scale, in the washing machine or in hand washing. These include, for example, detergents for textiles, carpets or natural fibers for which the term detergent is used. Washing and cleaning agents may be added to the actual detergent in manual or machine laundering in order to achieve a further effect. Furthermore, washing and cleaning agents also include textile pre-treatment and after-treatment agents, i.e. agents with which the piece of laundry is brought into contact before the actual washing, e.g. for loosening stubborn stains, and also such agents which give the laundry further desirable properties such as a pleasant handle, crease resistance or low static charge in a step following the actual textile washing process. The latter include e.g. fabric softeners.

The embodiments include all solid, powdery, liquid, gel or pasty dosage forms of the agents, which may consist of several phases and may be in compressed or non-compressed form. The agent may be available as a free-flowing powder, in particular with a bulk density of 300 g/l to 1200 g/l, in particular 500 g/l to 900 g/l or 600 g/l to 850 g/l. The solid dosage forms of the agent also include extrudates, granulates, tablets or pouches. Alternatively, the agent can also be liquid, gel or pasty, for example in the form of a non-aqueous liquid detergent or a non-aqueous paste or in the form of an aqueous liquid detergent or a water-containing paste. Liquids are generally preferred. The agent may also be present as a one-component system. Such agents consist of one phase. Alternatively, an agent can also consist of several phases. Such an agent is therefore divided into several components (multi component system).

The washing or cleaning agents, which may be present as powdery solids, in compacted particle form, as homogeneous solutions, gels or suspensions, may contain, in addition to the cutinase described above, all known ingredients commonly used in such agents, preferably at least one further ingredient being present in the agent. The agents may in particular contain surfactants, builders, bleaching agents, in particular peroxygen compounds, or bleach activators. They may also contain water-miscible organic solvents, further enzymes, sequestering agents, electrolytes, pH regulators and/or further auxiliaries such as optical brighteners, greying inhibitors, foam regulators as well as colorants and fragrances and combinations thereof.

In particular, a combination of the agent with one or more further ingredient(s) is advantageous, since such an agent in preferred embodiments exhibits an improved cleaning performance due to resulting synergisms. In particular, such a synergism can be achieved by combining the agent with a surfactant and/or a builder and/or a peroxygen compound and/or a bleach activator.

Beneficial ingredients of agents are disclosed in the international patent application WO 2009/121725 A1, beginning there on page 5, penultimate paragraph, and ending there on page 13 after the second paragraph. Explicit reference is made to this disclosure and the content of the disclosure is included in the present patent application.

In addition to cutinase, the agents preferably also contain at least one compound from the class of surfactants, in particular selected from anionic and non-ionic, but also cationic, zwitterionic or amphoteric surfactants.

In a preferred embodiment, the agents comprise, based on the total weight of the agent, a total amount of 2 to 70 wt. %, particularly preferred 5 to 65 wt. %, more preferred 7.5 to 60 wt. %, most preferred 10 to 60 wt. %, of surfactant. In various embodiments, the agents comprise, based on the total weight of the agent, a total amount of 2 to 30 wt. %, preferably 5 to 25 wt. %, more preferably 10 to 20 wt. %, most preferably 14 to 18 wt. %, of surfactant.

Suitable surfactants are, for example, anionic surfactants of the formula (I)

 (I).

In this formula (I), R is a linear or branched unsubstituted alkyl aryl residue. $Y^+$ represents a monovalent cation or the n-th part of an n-valent cation, preferably the alkali metal ions and among them $Na^+$ or $K^+$, $Na^+$ being most preferred. Further cations $Y^+$ can be selected from $NH_4^+$, ½ $Zn^{2+}$, ½ $Mg^{2+}$, ½ $Mn^{2+}$ and mixtures thereof.

"Alkyl aryl", as used herein, refers to organic residues consisting of an alkyl residue and an aromatic residue. Typical examples of such residues include, but are not limited to, alkyl benzene residues such as benzyl, butyl benzene, nonyl benzene, decyl benzene, undecyl benzene, dodecyl benzene, tridecyl benzene and the like.

In various embodiments, such surfactants are selected from linear or branched alkylbenzene sulfonates of formula A-1

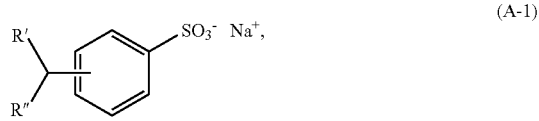 (A-1)

in which R' and R" together comprise 9 to 19, preferably 11 to 15 and in particular 11 to 13 carbon atoms. A particularly preferred representative can be described by the formula A-1a:

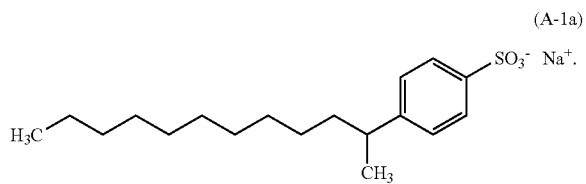 (A-1a)

In various embodiments, the compound of formula (I) is preferably the sodium salt of a linear alkyl benzene sulfonate.

In agents, the washing or cleaning agent contains at least one compound from the class of anionic surfactants of formula (I) in an amount of 0.1 to 35 wt. %, preferably 1 to 30 wt. %, more preferably 2 to 10 wt. %, more preferably 2 to 6 wt. %, even more preferred 3 to 5 wt. %, based in each case on the total weight of the cleaning agent.

In various embodiments, the agents preferably comprise at least one anionic surfactant of the formula

 (II).

In this formula (II), $R^1$ represents a linear or branched, substituted or unsubstituted alkyl, aryl or alkyl aryl residue, preferably a linear, unsubstituted alkyl residue, particularly preferably a fatty alcohol residue. Preferred $R^1$ residues are selected from decyl, undecyl, dodecyl, tridecyl, tetradecyl, pentadecyl, hexadecyl, heptadecyl, octadecyl, nonadecyl, eicosyl residues and mixtures thereof, the representatives having an even number of carbon atoms being preferred. Particularly preferred residues $R^1$ are derived from $C_{12}$-$C_{18}$ fatty alcohols, for example coconut fatty alcohol, sebum fatty alcohol, lauryl, myristyl, cetyl or stearyl alcohol or from $C_{10}$-$C_{20}$ oxo alcohols.

AO represents an ethylene oxide (EO) or propylene oxide (PO) grouping, preferably an ethylene oxide grouping. The index n represents an integer from 1 to 50, preferably from 1 to 20 and in particular from 2 to 10. Particularly preferred, n represents the numbers 2, 3, 4, 5, 6, 7 or 8. $X^+$ represents a monovalent cation or the n-th part of an n-valent cation, preferably the alkali metal ions and among them $Na^+$ or $K^+$, $Na^+$ being most preferred.

Further cations $X^+$ can be selected from $NH_4^+$, ½ $Zn^{2+}$, ½ $Mg^{2+}$, ½ $Ca^{2+}$, ½ $Mn^{2+}$ and mixtures thereof.

In summary, agents in various embodiments thus comprise at least one anionic surfactant selected from fatty alcohol ether sulfates of the formula A-2

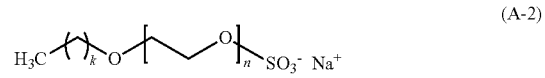 (A-2)

with k=11 to 19, n=2, 3, 4, 5, 6, 7 or 8. Particularly preferred representatives are Na—$C_{12-14}$ fatty alcohol ether sulfates with 2 EO (k=11-13, n=2 in formula A-2).

In various embodiments, the agent comprises at least one anionic surfactant of formula (II) in an amount of 2 to 10 wt. %, preferably 3 to 8 wt. %, based on the total weight of the agent.

Other anionic surfactants which can be used are the alkyl sulfates of the formula (III)

 (III).

In this formula (III), $R^2$ represents a linear or branched, substituted or unsubstituted alkyl residue, preferably a linear, unsubstituted alkyl residue, particularly preferably a fatty alcohol residue. Preferred $R^2$ residues are selected from decyl, undecyl, dodecyl, tridecyl, tetradecyl, pentadecyl, hexadecyl, heptadecyl, octadecyl, nonadecyl, eicosyl residues and mixtures thereof, the representatives having an even number of C atoms being preferred. Particularly preferred residues $R^2$ are derived from $C_{12}$-$C_{18}$ fatty alcohols, for example coconut fatty alcohol, sebum fatty alcohol, lauryl, myristyl, cetyl or stearyl alcohol or from $C_{10}$-$C_{20}$ oxo alcohols. $X^+$ represents a monovalent cation or the n-th part of an n-valent cation, preferably the alkali metal ions and among them $Na^+$ or $K^+$, whereby $Na^+$ is most preferred. Further cations $X^+$ can be selected from $NH_4^+$, ½ $Zn^{2+}$, ½ $Mg^{2+}$, ½ $Ca^{2+}$, ½ $Mn^{2+}$ and mixtures thereof.

In various embodiments, these surfactants are selected from fatty alcohol sulfates of the formula A-3

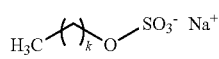
(A-3)

with k=11 to 19. Particularly preferred representatives are Na—$C_{12-14}$ fatty alcohol sulphates (k=11-13 in formula A-3).

In various embodiments, the agent may contain at least one further surfactant in addition to the anionic surfactants described above, in particular those of formulae (I) to (III), or alternatively at least one further surfactant. Further anionic surfactants, non-ionic surfactants and mixtures thereof, but also cationic, zwitterionic and amphoteric surfactants may be used as alternative or additional surfactants.

In various embodiments, the agents include at least one non-ionic surfactant, in particular at least one fatty alcohol alkoxylate.

In a preferred embodiment, the agents comprise, based on the total weight of the agent, 0.1 to 30 wt. %, also preferred 0.1 to 7 wt. %, particularly preferred 7 to 25 wt. %, also particularly preferred 3 to 7 wt. %, of nonionic surfactant.

Suitable non-ionic surfactants are those of the formula (IV)

$$R^3—O-(AO)_m—H \quad \quad (IV),$$

in which $R^3$ represents a linear or branched, substituted or unsubstituted alkyl residue, AO represents an ethylene oxide (EO) or propylene oxide (PO) grouping, m represents an integer from 1 to 50.

In the above formula (IV), $R_3$ represents a linear or branched, substituted or unsubstituted alkyl residue, preferably a linear, unsubstituted alkyl residue, particularly preferably a fatty alcohol residue. Preferred $R^3$ residues are selected from decyl, undecyl, dodecyl, tridecyl, tetradecyl, pentadecyl, hexadecyl, heptadecyl, octadecyl, nonadecyl, eicosyl residues and mixtures thereof, the representatives having an even number of C atoms being preferred. Particularly preferred residues $R^3$ are derived from $C_{12}$-$C_{18}$ fatty alcohols, for example coconut fatty alcohol, sebum fatty alcohol, lauryl, myristyl, cetyl or stearyl alcohol or from $C_{10}$-$C_{20}$ oxo alcohols.

AO represents an ethylene oxide (EO) or propylene oxide (PO) grouping, preferably an ethylene oxide grouping. The index m represents an integer from 1 to 50, preferably from 1 to 20 and in particular from 2 to 10. Particularly preferred m represents the numbers 2, 3, 4, 5, 6, 7 or 8.

In summary, the fatty alcohol alkoxylates preferably used are compounds of the formula (V)

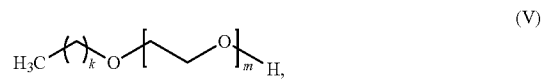
(V)

with k=11 to 19, m=2, 3, 4, 5, 6, 7 or 8. Particularly preferred representatives are $C_{12-18}$ fatty alcohols with 7 EO (k=11-17, m=7 in formula (V)).

Further non-ionic surfactants which may be contained in the described agents include but are not limited to alkyl glycosides, alkoxylated fatty acid alkyl esters, amine oxides, fatty acid alkanolamides, hydroxy mixed ethers, sorbitan fatty acid esters, polyhydroxy fatty acid amides and alkoxylated alcohols.

Suitable amphoteric surfactants are, for example, betaines of the formula $(R^{iii})(R^{iv})(R^v)N^+CH_2COO$ in which $R^{iii}$ is an alkyl residue having 8 to 25, preferably 10 to 21 carbon atoms, optionally interrupted by hetero atoms or hetero atom groups, and $R^{iv}$ and $R^v$ represent identical or different alkyl residues having 1 to 3 carbon atoms, in particular $C_{10}$-$C_{18}$ alkyl dimethyl carboxy methyl betaine and $C_{11}$-$C_{17}$ alkylamidopropyl dimethyl carboxy methyl betaine.

Suitable cationic surfactants include the quaternary ammonium compounds of the formula $(R^{vi})(R^{vii})(R^{viii})(R^{ix})N^+ \, X$ in which $R^{vi}$ to $R^{ix}$ represent four identical or different, in particular two long-chained and two short-chained, alkyl residues and X represents an anion, in particular a halide ion, for example didecyl dimethyl ammonium chloride, alkyl benzyl didecyl ammonium chloride and mixtures thereof. Other suitable cationic surfactants are the quaternary surface-active compounds, especially those with a sulfonium, phosphonium, iodonium or arsonium group, which are also known as antimicrobial agents. By using quaternary surface-active compounds with an antimicrobial effect, the agent can be designed with an antimicrobial effect or its antimicrobial effect already existing due to other ingredients can be improved.

In various embodiments, the total amount of surfactants based on the weight of the agent is 2 to 30 wt. %, preferably 5 to 25 wt. %, more preferably 10 to 20 wt. %, most preferably 14 to 18 wt. %, wherein the (linear) alkyl benzene sulfonates are present in an amount of 0.001 to 30 wt. %, preferably 0.001 to 10 wt. %, more preferably 2 to 6 wt. %, more preferably 3 to 5 wt. %, based on the weight of the agent.

Washing or cleaning agents may contain further enzymes besides cutinase. These can be hydrolytic enzymes or other enzymes in a concentration appropriate for the effectiveness of the agent. An embodiment therefore represents agents comprising one or more enzymes. The preferred enzymes to be used are all enzymes which are able to develop catalytic activity, in particular a protease, amylase, cellulase, hemicellulase, mannanase, tannase, xylanase, xanthanase, xyloglucanase, β-glucosidase, pectinase, carrageenase, perhydrolase, oxidase, oxidoreductase, hydrolase, PETase or a lipase, as well as mixtures thereof. Enzymes are advantageously present in the agent in an amount of $1 \times 10^{-8}$ to 5 wt. % based on active protein. Increasingly preferred, each enzyme is contained in the agents in an amount of $1 \times 10^{-7}$ to 3 wt. %, of 0.00001 to 1 wt. %, of 0.00005 to 0.5 wt. %, of 0.0001 to 0.1 wt. % and particularly preferred of 0.0001 to 0.05 wt. % based on active protein. The enzymes show particularly preferred synergistic cleaning performance with respect to certain soiling or stains, i.e. the enzymes contained in the medium composition support each other in their cleaning performance. Synergistic effects can occur not only between different enzymes, but also between one or more enzymes and other ingredients of the agent.

Particularly preferred, the cutinase can be used in combination with a cellulase on polyester/cotton blend textiles. The cutinase prevents the polyester fibers from pilling, while the cellulase has the same effect on the cotton fibers. The cellulase is preferably a cellulase mixture or a one-component cellulase, preferably or predominantly an endoglucanase and/or a cellobiohydrolase.

The amylase is preferably an α-amylase. Hemicellulase is preferably a β-glucanase, a pectinase, a pullulanase and/or a mannanase. Oxidoreductase is preferably an oxidase, in particular a choline oxidase, or a perhydrolase.

The proteases used are preferably alkaline serine proteases. They act as non-specific endopeptidases, i.e. they hydrolyze any acid amide bonds which lie inside peptides or proteins and thus cause the degradation of protein containing soiling on the cleaning material. Their pH optimum is usually in the clearly alkaline range.

The protein concentration can be determined using known methods, for example the BCA method (bicinchonic acid; 2,2'-biquinolyl-4,4'-dicarboxylic acid) or the Biuret method. The active protein concentration is determined by titration of the active centers using a suitable irreversible inhibitor (e.g. phenyl methyl sulfonyl fluoride (PMSF) for proteases) and determination of the residual activity (see M. Bender et al., J. Am. Chem. Soc. 88, 24 (1966), p. 5890-5913).

In the detergents described herein, the enzymes to be used may also be packaged together with accompanying substances, e.g. from fermentation. In liquid formulations, the enzymes are preferably used as liquid enzyme formulation(s).

The enzymes are usually not provided in the form of pure protein, but rather in the form of stabilized preparations that can be stored and transported. These pre-confectioned preparations include, for example, the solid preparations obtained by granulation, extrusion or lyophilization or, in case of liquid or gel preparations in particular, enzyme solutions which are advantageously as concentrated as possible, low in water and/or mixed with stabilizers or other additives.

Alternatively, the enzymes can be encapsulated both for the solid and for the liquid dosage form, for example by spray-drying or extrusion of the enzyme solution together with a preferably natural polymer or in the form of capsules, for example those in which the enzymes are enclosed as in a solidified gel or in those of the core-shell type in which an enzyme-containing core is coated with a protective layer impermeable to water, air and/or chemicals. Additional active substances such as stabilizers, emulsifiers, pigments, bleaching agents or dyes can also be applied in deposited layers. Such capsules are applied according to methods known per se, for example by shaking or roll granulation or in fluid-bed processes. Advantageously, such granulates are low in dust, e.g. by applying polymer film formers, and are storage-stable due to the coating.

Furthermore, it is possible to assemble two or more enzymes together so that a single granulate has several enzyme activities.

The enzymes can also be incorporated into water-soluble films, such as those used in the packaging of detergents in unit dose form. Such a film enables the release of enzymes after contact with water. As used herein, "water soluble" refers to a film structure that is preferably completely water soluble. Preferably such a film consists of (fully or partially hydrolyzed) polyvinyl alcohol (PVA).

In various embodiments, one or more enzyme stabilizers may be used, such as but not limited to sodium formate, sodium sulfate, lower aliphatic alcohols and boric acid and their esters and salts. Of course, two or more of these compounds can also be used in combination. The salts of these compounds can also be used in the form of hydrates, such as sodium sulfate decahydrate.

The term "lower aliphatic alcohols" as used herein includes mono-alcohols, diols and higher alcohols with up to 6 carbon atoms. In this context, polyols such as glycerol, (mono)ethylene glycol, (mono)propylene glycol or sorbitol are particularly mentioned as belonging to the group of lower aliphatic alcohols, without the invention being limited to them.

In addition to at least one enzyme stabilizer selected from the above group, an agent may also contain at least one further stabilizer. Such stabilizers are known in the state of the art.

Reversible protease inhibitors protect the enzymes contained in a washing or cleaning agent from proteolytic degradation by reversibly inhibiting the enzymatic activity of the proteases contained in the agent. Benzamidine hydrochloride, boronic acids or their salts or esters are frequently used as reversible protease inhibitors, among them mainly derivatives with aromatic groups, such as ortho-, meta- or para-substituted phenyl boronic acids, in particular 4-formyl phenyl boronic acid, or the salts or esters of the compounds mentioned. Peptide aldehydes, i.e. oligopeptides with reduced C-terminus, in particular those consisting of 2 to 50 monomers, are also used for this purpose. Peptide reversible protease inhibitors include ovomucoid and leupeptin.

Further enzyme stabilizers are amino alcohols such as mono-, di-, triethanol- and propanolamine and mixtures thereof, aliphatic carboxylic acids up to $C_{12}$, such as succinic acid, other dicarboxylic acids or salts of these acids. End-capped fatty acid amide alkoxylates are also suitable for this purpose. Some organic acids used as builders are also able to act as enzyme stabilizers. Calcium and/or magnesium salts, such as calcium acetate, are also used for this purpose.

Polyamide oligomers or polymeric compounds such as lignin, water-soluble vinyl copolymers or cellulose ethers, acrylic polymers and/or polyamides stabilize the enzyme preparation against physical influences or pH fluctuations, among other things. Polymers containing polyamine-N-oxide act simultaneously as enzyme stabilizers and color transfer inhibitors. Other polymeric stabilizers are linear $C_8$-$C_{18}$ polyoxyalkylenes. Alkyl polyglycosides can also stabilize the enzymatic components of the agent and are preferably able to additionally increase their performance. Crosslinked N-containing compounds preferably fulfil a dual function as soil-release agents and as enzyme stabilizers. Hydrophobic, non-ionic polymer stabilizes in particular a cellulase which may be present.

Reducing agents and antioxidants increase the stability of enzymes against oxidative degradation; for this purpose, sulphur containing reducing agents such as sodium sulfite and reducing sugars are common.

In one embodiment, the agents are liquid and contain water as main solvent, i.e. they are aqueous agents. The water content of the aqueous agent is usually 1 to 70 wt. %, preferably 3 to 65 wt. %, more preferred 5 to 60 wt. %. In various embodiments, the water content is more than 5 wt. %, preferably more than 15 wt. % and particularly preferred more than 50 wt. %, based in each case on the total amount of agent.

In addition, non-aqueous solvents can be added to the agent. Suitable non-aqueous solvents include monohydric or polyhydric alcohols, alkanolamines or glycol ethers, provided they are miscible with water within the specified concentration range. The solvents shall preferably be selected from ethanol, n-propanol, i-propanol, butanols, glycol, propanediol, butanediol, methyl propanediol, glycerol, diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol monomethyl ether, dipropylene glycol monomethyl ether, methoxytriglycol, ethoxytriglycol, butoxytriglycol, 1-butoxyethoxy-2-propanol, 3-methyl-3-methoxybutanol, propylene glycol t-butyl ether, di-n-octyl ether and mixtures of these solvents.

The one or more non-aqueous solvents is/are usually contained in an amount of 0.1 to 25 wt. %, preferably 0.5 to 10 wt. %, more preferred 1 to 8 wt. %, based on the total amount of agent.

In addition to the components mentioned above, the agents may contain other ingredients which further improve the technical application and/or aesthetic properties of the detergent. These include, for example, additives for improving the run-off and drying behavior, for adjusting the viscosity and/or for stabilization, as well as other auxiliaries and additives commonly used in detergents, such as UV stabilizers, perfume, pearlescent agents, dyes, corrosion inhibitors, preservatives, bitter substances, organic salts, disinfectants, structuring polymers, defoamers, encapsulated ingredients (e.g. capsulated perfume), pH adjusting agents as well as skin feeling improving or caring additives.

An agent, in particular a washing or cleaning agent, preferably contains at least one water-soluble and/or water-insoluble, organic and/or inorganic builder (builders).

In particular, amino carboxylic acids and their salts, zeolites, silicates, carbonates, organic (co)builders and—where there are no ecological prejudices against their use—phosphates are among the generally usable builders. Preferably, however, the agents are phosphate-free.

Water-soluble organic builders include polycarboxylic acids, especially citric acid and sugar acids, monomeric and polymeric amino polycarboxylic acids, especially methyl glycine diacetic acid, nitrilotriacetic acid and ethylene diamine tetraacetic acid as well as polyaspartic acid, polyphosphonic acids, especially aminotris(methylene phosphonic acid), ethylene diamine tetrakis(methylene phosphonic acid) and 1-hydroxyethane-1,1-diphosphonic acid, polymeric hydroxy compounds such as dextrin and polymeric (poly)carboxylic acids, polymeric acrylic acids, methacrylic acids, maleic acids and copolymers thereof, which may also contain small proportions of polymerizable substances without carboxylic acid functionality in copolymerized form. Suitable, albeit less preferred, compounds of this class are copolymers of acrylic acid or methacrylic acid with vinyl ethers, such as vinyl methyl ethers, vinyl esters, ethylene, propylene and styrene, in which the proportion of the acid is at least 50 wt. %. The organic builders can be used in the form of aqueous solutions, preferably in the form of 30 to 50 wt. % aqueous solutions, especially for the production of liquid agents. All the acids mentioned are generally used in the form of their water-soluble salts, in particular their alkali salts.

Organic builders may, if desired, be present in amounts of up to 40 wt. %, in particular up to 25 wt. % and preferably from 1 to 8 wt. %. Quantities close to the above upper limit are preferably used in paste-like or liquid, in particular water-containing, agents. Laundry after-treatment agents, e.g. fabric softeners, may also be free of organic builder.

Water-soluble inorganic builder materials are especially alkali silicates and polyphosphates, preferably sodium triphosphate. Water-insoluble, water-dispersible inorganic builder materials, in particular crystalline or amorphous alkali metal aluminosilicates, can be used, if desired, in quantities of up to 50 wt. %, preferably not more than 40 wt. %, and in liquid compositions, in particular from 1 to 5 wt. %. Among these, crystalline sodium aluminosilicates in detergent quality, in particular zeolite A, P and optionally X, are preferred. Quantities close to the above upper limit are preferably used in solid particulate detergents. Suitable aluminosilicates in particular have no particles with a particle size above 30 µm and preferably consist of at least 80 wt. % of particles with a size below 10 µm.

Suitable substitutes or partial substitutes for the above aluminosilicate are crystalline alkali silicates, which may be present alone or in a mixture with amorphous silicates. The alkali silicates which can be used as builders in the agents preferably have a molar ratio of alkali oxide to $SiO_2$ below 0.95, in particular from 1:1.1 to 1:12, and may be amorphous or crystalline. Preferred alkali silicates are sodium silicates, in particular amorphous sodium silicates, with a molar ratio $Na_2O:SiO_2$ of 1:2 to 1:2.8. Crystalline silicates, which may be present alone or in mixture with amorphous silicates, are preferably crystalline layered silicates of the general formula $Na_2Si_xO_{2x+1} \cdot y\,H_2O$ in which x, the so-called modulus, is a number from 1.9 to 4 and y is a number from 0 to 20 and preferred values for x are 2, 3 or 4. Preferred crystalline layer silicates are those in which x has the values 2 or 3 in the general formula mentioned. In particular, both beta- and delta-sodium disilicates ($Na_2Si_2O_5 \cdot y\,H_2O$) are preferred. Crystalline alkali metal silicates which are practically anhydrous and are prepared from amorphous alkali metal silicates and have the above general formula, in which x is a number from 1.9 to 2.1, and are also prepared from amorphous alkali metal silicates, can also be used in agents. In another preferred embodiment a crystalline sodium layer silicate with a modulus of 2 to 3 is used as it can be produced from sand and soda ash. Crystalline sodium silicates with a modulus in the range 1.9 to 3.5 are used in another preferred embodiment. If alkali aluminosilicate, in particular zeolite, is also present as an additional builder, the weight ratio of aluminosilicate to silicate, based in each case on anhydrous active substances, is preferably 1:10 to 10:1. In agents which contain both amorphous and crystalline alkali silicates, the weight ratio of amorphous alkali silicate to crystalline alkali silicate is preferably 1:2 to 2:1 and in particular 1:1 to 2:1.

Builders are, if desired, present in the agents preferably in amounts of up to 60 wt. %, in particular from 5 to 40 wt. %. Water-soluble builders are particularly preferred in liquid formulations. Laundry after-treatment agents, e.g. fabric softeners, are preferably free of inorganic builders.

Polymeric thickeners are polycarboxylates which act as polyelectrolytes, preferably homo and copolymers of acrylic acid, in particular acrylic acid copolymers such as acrylic acid-methacrylic acid copolymers, and polysaccharides, in particular heteropolysaccharides, as well as other conventional thickening polymers.

Suitable polysaccharides or heteropolysaccharides are polysaccharide rubbers, e.g. gum arabic, agar, alginates, carrageenans and their salts, guar, guaran, tragacant, gellan, ramsan, dextran or xanthan and their derivatives, e.g. propoxylated guar, as well as their mixtures. Further polysaccharide thickeners, such as starches or cellulose derivatives, can be used alternatively, but preferably in addition to a polysaccharide rubber, for example starches of different origin and starch derivatives, e.g. hydroxyethyl starch, starch phosphate ester or starch acetates, or carboxymethyl cellulose or its sodium salt, methyl, ethyl, hydroxyethyl, hydroxypropyl, hydroxypropyl methyl or hydroxyethyl methyl cellulose or cellulose acetate.

Acrylic acid polymers suitable as polymeric thickeners are, for example, high-molecular homopolymers of acrylic acid (INCI carbomer) crosslinked with a polyalkenyl polyether, in particular an allyl ether of sucrose, pentaerythritol or propylene, which are also referred to as carboxyvinyl polymers.

However, the following acrylic acid copolymers are particularly suitable polymer thickeners: (i) copolymers of two or more monomers selected from the group consisting of acrylic acid, methacrylic acid and their mono-esters, preferably formed with $C_{1-4}$ alkanols (INCI acrylate copolymers), such as the copolymers of methacrylic acid, butyl acrylate and methyl methacrylate (CAS 25035 69 2) or of butyl acrylate and methyl methacrylate (CAS 25852 37 3); (ii) crosslinked high-molecular acrylic acid copolymers including, for example, the copolymers of $C_{10-30}$ alkyl acrylates crosslinked with an allyl ether of sucrose or pentaerythritol, with one or more monomers selected from the group consisting of acrylic acid, methacrylic acid and their mono-esters (INCI acrylates/$C_{10-30}$ alkyl acrylates cross-polymers), preferably formed with $C_{1-4}$ alkanols.

The content of polymeric thickening agent is usually not more than 8 wt. %, preferably from 0.1 to 7 wt. %, particularly preferred from 0.5 to 6 wt. %, particularly from 1 to 5 wt. % and most preferred from 1.5 to 4 wt. %, for example from 2 to 2.5 wt. %, based on the total weight of the agent.

One or more dicarboxylic acids and/or their salts, in particular a composition of Na salts of adipic acid, succinic acid and glutaric acid, as obtainable for example under the trade name Sokalan® DSC, can be added to stabilize the agent, in particular with a high surfactant content. It is advantageously used here in quantities from 0.1 to 8 wt. %, preferably from 0.5 to 7 wt. %, in particular from 1.3 to 6 wt. % and particularly preferred from 2 to 4 wt. %, based on the total weight of the agent.

However, dicarboxylic acid (salts) may also be absent.

A further aspect relates to a method for cleaning textiles, which is characterized in that at least one method step involves the use of an agent. The textiles preferably contain or consist of polyester.

In various embodiments, a temperature of 0-100° C., preferably 0-80° C., further preferably 20-60° C. and most preferred 20-40° C. may be used with the cleaning of textiles.

This includes both manual and mechanical methods, whereby mechanical methods are preferred. Methods for cleaning textiles are generally characterized in that, in a number of method steps, various detergent-active substances are applied to the material to be cleaned and washed off after the contact time, or that the material to be cleaned is otherwise treated with a washing agent or a solution resp. dilution of this agent. All conceivable washing or cleaning methods can be enriched in at least one of the method steps by application of a washing or cleaning agent and then represent embodiments. All facts, objects and embodiments described for agents are also applicable to this aspect. Therefore, it is expressly referred to the disclosure in the appropriate place with the note that this disclosure also applies to the above methods.

Since enzymes naturally already have a catalytic activity and also show this activity in media which otherwise have no cleaning power, as for example in mere buffers, a single and/or the only step of such a method can consist in bringing a cutinase into contact with the soiling as the only active cleaning component, preferably in a buffer solution or in water. This is another embodiment.

Alternative embodiments of this aspect are also methods for the treatment of textile raw materials or for textile care, in which at least one method step activates an agent. These include methods for textile raw materials, fibers or textiles with synthetic components, and especially those with polyester.

Furthermore, the agent may be used as a washing or cleaning agent as described above, for (improved) removal of stains, for example from textiles, in particular polyester textiles.

Finally, a cutinase may improve anti-pilling effects and/or to improve anti-grey effects of a washing or cleaning agent, preferably a detergent, particularly preferred a liquid detergent, the agent containing the cutinase. The cutinase is a cutinase as defined herein. In various embodiments of its use, the cutinase is present in the agent in an amount from 0.00001 to 1 wt. %, preferably in an amount from 0.0001 to 0.5 wt. %, particularly preferred in an amount from 0.001 to 0.1 wt. %. In further embodiments, the cutinase, which causes a reduction of the pilling effect, is applied to textiles, in particular textiles consisting of or comprising polyester.

All facts, objects and embodiments described for agents and the cutinase are also applicable to the other aspects. Therefore, reference is expressly made here to the disclosure at the appropriate place with the note that this disclosure also applies to the above methods and the uses.

EXAMPLES

Example 1: Cloning and Expression

Cloning and expression of the cutinase used in the agent can be performed in a system selected from the group consisting of *Escherichia coli* (*E. coli*), *Bacillus subtilis* and *Bacillus licheniformis*.
Expression in *E. coli*
*E. coli* BL21(pLyS) and BL21 DE3
Vector (6,162 bp): pET_22b
Subcloning sites: NdeI/XhoI (802 bp)
Preparation of Expression Vector The nucleotide sequence encoding for a protein having cutinase-like esterase activity was synthesized and subcloned at the restriction sites NdeI and XhoI in the pET_22b vector backbone. The sequence was also subcloned including a his-tag at the C-terminal. The sequence was codon optimized for its expression in *E. coli*. The original sequence was previously isolated from a gene library that was constructed using a metagenome derived from a foliage compost. (WO 2012/099018 A1). The vector was transformed in *E. coli* BL21 DE3. The sequence of the plasmid was confirmed by restriction pattern and sequencing.
*E. coli* Expression Culture conditions in shake flask using *E. coli* BL21 DE3 transformed with pET_22b-Esterase 3-13: The strain was cultured in 3 ml of LB medium (1% (w/v) Bacto tryptone, 0.5% (w/v) yeast extract and 1% (w/v) NaCl) with ampicillin (100 μg/ml) at 37° C. and 180 rpm for 12 hours. One ml of this culture was used to inoculate 100 ml of LB ampicilin in 500 ml shake flasks. Once the culture reaches an OD of 0.9 at 600 nm, the expression was induced using 0.5 mM IPTG carried out at OD (600 nm) of 0.9. The temperature was reduced to 30° C. and the culture was induced for 4 hours.

The activity of the cutinase-like esterase is determined spectrophotometrically by the hydrolysis of p-NPC. The increased absorbance at 410 nm is monitored for 5 min at 37° C. Change of absorption must be linear over the period of measurement.

Production of the Variants in *E. coli*

The cutinase-like esterase variants, both expressed in *E. coli* BL21 DE3 are produced at 5 L bioreactor operated at 3 L working volume. After 48 h fed-batch fermentation, the cells were harvested and the supernatant fraction and the pellet fraction (biomass) were separated by centrifugation.

Downstream Processing

The biomass was disrupted using ultrasound and further centrifugation (20 min, 8,000 rpm, 4° C.). The supernatant was heated at 70° C. for 10 min and centrifuged at 15,000 rpm, 4° C. for 20 min to remove the insoluble fraction.

Example 2: Washing Test

Used Detergent Matrix

A commercially available detergent matrix (without perfume and dyes) have been used for the washing test:

| Chemical Name | wt.-% active matter in raw material | wt.-% active matter in formula |
|---|---|---|
| Water demin. | 100 | Rest |
| Boric acid | 100 | 0.3-1 |
| Citric acid | 100 | 0.1-2 |
| Antifoam | t.q. | 0.05-0.01 |
| FAEOS | 70 | 2-6 |
| FAEO, non-ionic surfactant | 100 | 3-7 |
| LAS | 96 | 3-7 |
| Coconut fatty acid | 30 | 0.3-1 |
| NaOH | 50 | 0.3-1 |
| Glycerol | 99.5 | 0.3-1 |
| Dequest | 40 | 0.1-0.8 |
| Preserving agent | 100 | 0.05-0.1 |
| Optical brightener | 90 | 0.01-0.08 |
| Thickener | 25 | 1-3 |
| Enzymes | 100 | 0.5-2 |
| Without dye and perfume | | |
| Dosage (ml) normal soiled & wh | | 50 ml |

Washing Test to Determine the Anti Pilling Performance of Enzymes

In a commercially available washing machine, 20 identical tests have been carried out one after another. Various polyester and mixed textiles have been used as textiles to be evaluated, the textiles had been pre-pilled resp. new. After 20 test washing cycles, the pilling reduction of the pre-pilled fabrics and the pilling formation of the new fabrics have been visually assessed.

The pre-pilled fabrics had been produced by 10-fold repeated washing cycles at 40° C. in commercially available washing machines.

After each washing cycle, the complete laundry has been dried in the dryer.

Washing Conditions

Water with 16° dH, 2.5 kg clean laundry, 40° C. standard program, 50 ml detergent as described above per machine Dosage of the cutinase to be evaluated: 50 mg active enzyme per washing machine Sample 1: only detergent as described above (comparative example)

Sample 2: detergent+50 mg of variant 1 (inventive example)

Sample 3: detergent+50 mg of variant 2 (inventive example)

Sample 4: detergent+50 mg of wildtype cutinase according to SEQ ID NO:1

Result After 20 Washing Cycles for New 100% Polyester Textile

Visually determination of pilling formation, scale 1-5, very high pilling formation=1, no pilling=5

Sample 1: 1.0
Sample 2: 4.4
Sample 3: 4.4
Sample 4: 2.6

Change of 0.5 units is considered to be significant.

Result After 20 Washing Cycles for Pre Pilled 100% Polyester Textile

Visually determination of pilling formation, scale 1-5, very high pilling formation=1, no pilling=5

Sample 1: 1.0
Sample 2: 2.8
Sample 3: 2.7
Sample 4: 1.1

Change of 0.5 units is considered to be significant.

The cutinases significantly improve the pilling appearance.

The invention claimed is:

1. A washing or cleaning agent comprising;
a cutinase having at least 85% sequence identity with the amino acid sequence set forth in SEQ ID NO:1 over the entire length thereof and has, with respect to the numbering according to SEQ ID NO:1,
at least one amino acid substitution selected from the group of: T61S, D63E, D63T, S66A, S66C, R89L, R89K, F90I, Y92D, Y92C, Y92A, W155A, W155Y, V177P, F208E, F208Q, F208Y, N211E, N211D, and N211Q; and,
wherein the cutinase with an amino acid substitution exhibits improved anti-pilling performance when compared to the cutinase comprising the amino acid sequence set forth in SEQ ID NO:1.

2. The washing or cleaning agent according to claim 1, wherein the cutinase comprises an amino acid sequence which has at least 90% sequence identity with the amino acid sequence set forth in SEQ ID NO:1 over the entire length thereof.

3. The washing or cleaning agent according to claim 1, wherein:
(a) the cutinase is obtained from a cutinase as defined above as a starting molecule by single or multiple conservative amino acid substitution; and/or
(b) the cutinase is obtained from a cutinase as defined as above as a starting molecule by fragmentation, deletion mutagenesis, insertion mutagenesis, or substitution mutagenesis and comprises an amino acid sequence that matches the starting molecule over a length of at least 169 interconnected amino acids, the at least one amino acid substitutions contained in the starting molecule still being present in the at least one position selected from the positions that correspond to positions 61, 63, 66, 89, 90, 92, 155, 177, 208 and 211 in SEQ ID NO: 1.

4. The washing or cleaning agent according to claim 1, wherein the cutinase is present in the washing or cleaning agent in an amount ranging from 0.00001 to 1 wt. %.

5. The washing or cleaning agent according to claim 1 further comprising one or more additional ingredients selected from the group consisting of surfactants, builders, bleaching agents, bleach activators, water-miscible organic solvents, further enzymes, sequestering agents, electrolytes, pH regulators, optical brighteners, greying inhibitors, foam regulators, colorants and fragrances, and combinations thereof; and/or wherein the washing or cleaning agent is solid or liquid.

6. A method for cleaning of textiles, wherein the method comprises applying the washing or cleaning agent of claim 1 to a textile.

7. The method according to claim 6, wherein the textile comprises or consists of polyester.

8. The method according to claim 5, further comprising removing of soiling and/or malodor as compared to the textile in the absence of the washing or cleaning agent.

9. The method according to claim 5, further comprising improving anti-pilling, improving anti-greying, improving cleaning performance, reducing pilling, and combinations thereof as compared to the textile in the absence of the washing or cleaning agent.

10. The washing or cleaning agent of claim 1, wherein the washing or cleaning agent is a liquid detergent.

11. The washing or cleaning agent of claim 1, wherein the cutinase is present in the washing or cleaning agent in an amount ranging from about 0.001 to 0.1 wt. %.

* * * * *